United States Patent
Wu et al.

(10) Patent No.: US 8,458,204 B2
(45) Date of Patent: Jun. 4, 2013

(54) SYSTEM AND METHOD FOR CUSTOMIZED FILE COMPARISON

(75) Inventors: Yunfei Wu, El Monte, CA (US); Tiancai Yin, Shanghai (CN); Xianhong Zhang, Shanghai (CN); Shingchi Hsu, Cypress, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 336 days.

(21) Appl. No.: 12/564,506

(22) Filed: Sep. 22, 2009

(65) Prior Publication Data

US 2011/0072027 A1 Mar. 24, 2011

(51) Int. Cl.
*G06F 7/00* (2006.01)
*G06F 17/00* (2006.01)
*G06F 17/30* (2006.01)

(52) U.S. Cl.
USPC ............ 707/758; 707/767; 707/771; 707/780

(58) Field of Classification Search
USPC ............ 707/602; 706/45, 47; 715/234; 705/2
See application file for complete search history.

(56) References Cited

U.S. PATENT DOCUMENTS

| | | | |
|---|---|---|---|
| 7,392,471 B1 * | 6/2008 | Ford et al. | 715/234 |
| 7,469,238 B2 * | 12/2008 | Satchwell | 706/45 |
| 7,849,049 B2 * | 12/2010 | Langseth et al. | 707/602 |
| 2006/0294120 A1 | 12/2006 | Li | |
| 2009/0018866 A1 * | 1/2009 | Christen | 705/2 |
| 2009/0271351 A1 * | 10/2009 | Kandasamy et al. | 706/47 |

OTHER PUBLICATIONS

"Using the XML Diff and Patch Tool in your Applications", Neetu Rajpal, Microsoft Corporation, Aug. 29, 2002.*
PCT International Search Report dated Dec. 16, 2010 corresponding to PCT Patent Application No. PCT/US2010/049792 filed Sep. 22, 2010.
Dimitrios S. Kolovos et al.; Gamma '06 Proceedings of the 2006 Int'l Workshop on Global Integrated Model Management; Shangai, CN; ISBN: 1-59593-410-3; Retrieved from the Inter.
Dimitrios S. Kolovos, Richard F. Paige, and Fiona A.C. Polack: Eclipse Modeling Symposium; Retrieved from the Internet: URL: http://www.eclipsecon.org/summiteurope2006/present.

* cited by examiner

Primary Examiner — Susan Chen

(57) ABSTRACT

A method and related data processing system and computer readable medium. A method includes receiving, in a data processing system, a first file and a second file, and receiving comparison rules. This method includes comparing the first file and the second file, by the data processing system, according to the comparison rules, and producing an output report corresponding to the comparison.

19 Claims, 3 Drawing Sheets

FIG. 2

CheckMate Compare Report

NOT Match

Legend:

| XXXXXX | Channel | Removed |

Work Log <D:/workdir/VC++ Programming/BOC comparison tool/log files/111.xml>

- <PLMXML>
  - date = 2008-04-25
  - time = 18:19:44
  - xmlns = http://www.plmxml.org/Schemas/PLMXMLSchema
  - author = CheckMate 1.2
  - version = 1.00
  - xmlns:chk = http://www.plmxml.org/Schemas/PLMXMLSchemaCheckMate
  - schemaVersion = 1.0
    - <chk:CheckReport>
      - user = zhangk
      - status = fail
      - machineProcessors = 1
      - checkMateSchemaVersion = 1.2
        - <chk:CheckPart>
          - mod = 1209118774
          - name = model4.prt
          - user = zhangk
          - status = fail
          - machine = NT Intel
          - partRef = E:\attachment\NX_DEV_PARTS\a.prt
          - program = Nx 6.0.0.23
          - version = 195
            - <chk:Profile>
              - name = mqc_file_structure_profile_0
              - class = mqc_file_structure_profile
              - status = fail00

Master Log <D:/workdir/VC++ Programming/BOC comparison tool/log files/222.xml>

- <PLMXML>
  - date = 2008-04-25
  - time = 18:20:06
  - xmlns = http://www.plmxml.org/Schemas/PLMXMLSchema
  - author = CheckMate 1.2
  - version = 1.00
  - xmlns:chk = http://www.plmxml.org/Schemas/PLMXMLSchemaCheckMate
  - schemaVersion = 1.0
    - <chk:CheckReport>
      - user = zhangk
      - machineProcessors = 1
      - checkMateSchemaVersion = 1.2
      - machineOS = Windows NT 5.1 (Build 2600: Service Pack 2)
      - machineName = shappdczhangk
      - machineType = GenuineIntel Family 6 . Intel (R) 1.86GHz
      - machineMemory = 2047Mb
        - <chk:CheckPart>
          - mod = 1209118774.5
          - name = model4.prt
          - user = zhangk
          - machine = NT Intel
          - partRef = E:\attachment\NX_DEV_PARTS\a.prt
          - program = NX 6.0.0.23
          - version = 15
            - <chk:Profile>
              - name = mqc_file_structure_profile_1
              - class = mqc_file_structure_profile

SYSTEM AND METHOD FOR CUSTOMIZED FILE COMPARISON

TECHNICAL FIELD

The present disclosure is directed, in general, to data processing systems and methods.

BACKGROUND OF THE DISCLOSURE

Data processing systems and networks often require data that satisfies certain constraints.

SUMMARY OF THE DISCLOSURE

A method and related data processing system and computer readable medium. A method includes receiving, in a data processing system, a first file and a second file, and receiving comparison rules. This method includes comparing the first file and the second file, by the data processing system, according to the comparison rules, and producing an output report corresponding to the comparison.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2 illustrates an example of an output report according to various embodiments.

DETAILED DESCRIPTION

Figure 1:
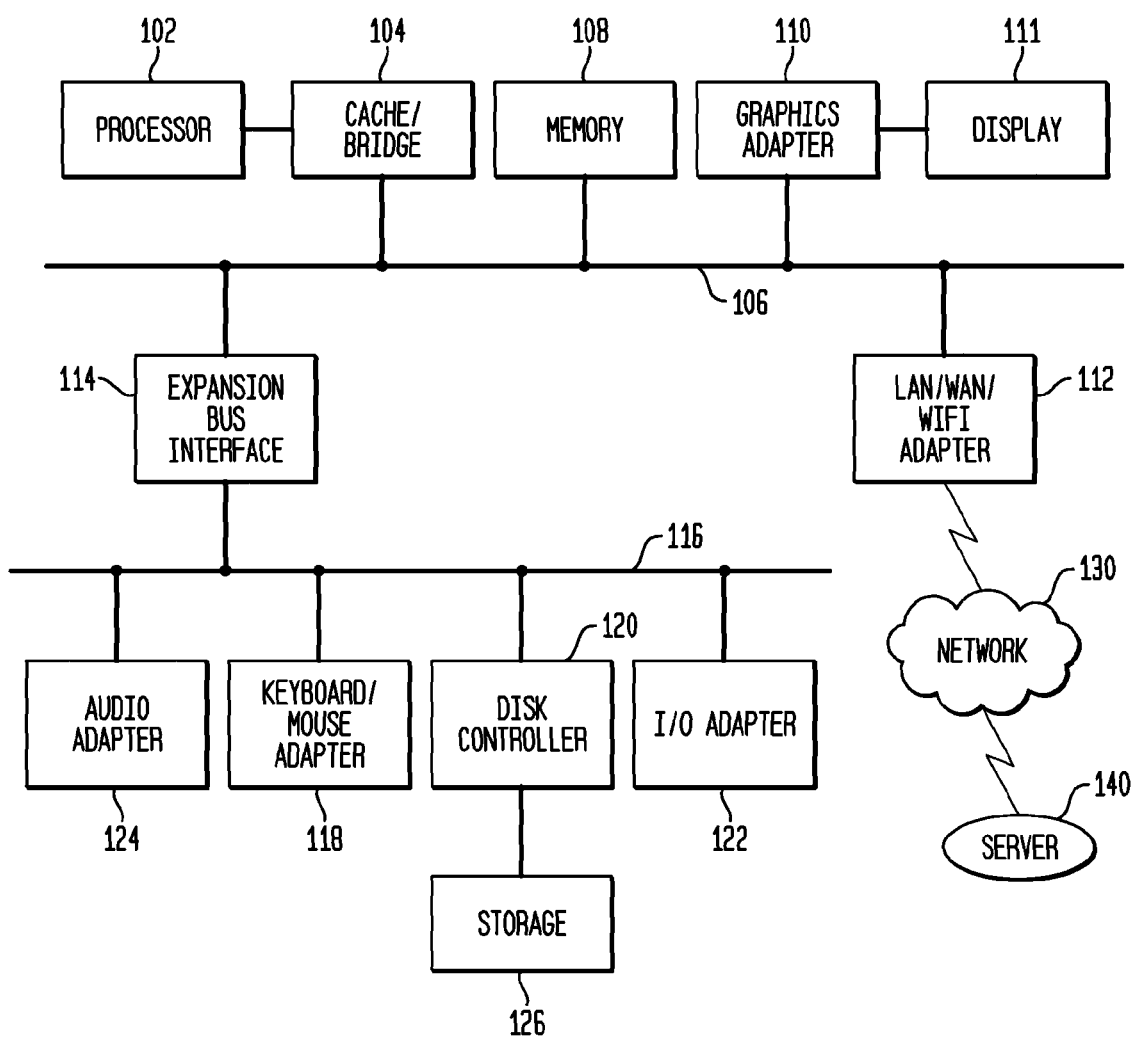
FIG. 1 depicts a block diagram of a data processing system in which an embodiment of the disclosed XML comparison process can be implemented.
Figure 3:
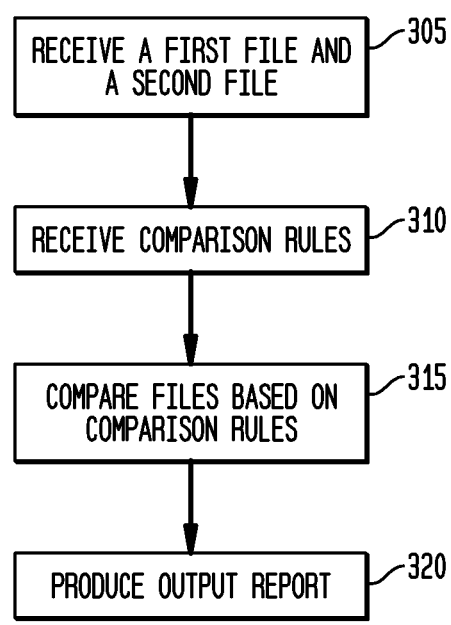
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments perform a customized XML data comparison process using an API so that any application can use this API to generate reports for data or log information. This process and API can be used in various fields where the XML data are stored and customized comparisons are needed.

The XML file format is widely used today. When XML file is used in logging or in result reporting, there are frequently requests for the XML data comparison. Current XML comparison tools are based on text comparison in XML node data, which cannot satisfy many practical implementations.

For example, the XML files include a distance tolerance output and the system is to compare them.

XML piece 1:
<distance tolerance="0.02"/>
XML piece 2:
<distance tolerance="0.002"/>

With a typical XML comparison tool, XML piece 1 and XML piece 2 will be marked as different. But in many practical implementations, if a tolerance 0.0254 is sufficient for manufacturing, for example, the comparison result for above XML pieces should be the same.

Another example will the checking results to in computer aided design, drafting, manufacturing, or visualization systems (individually and collectively, "CAD systems"). If an XML result file for a part contains five checker results, but a second XML result file contains only one checker results, identical to the corresponding result in the first XML result file, a typical XML comparison tool will report these two XML files as different. However, may practical implementations require that the comparison result be the same if only the specific common result is important to the comparison.

Different applications have different requirements for the XML comparison results. To compare the data simply by text is not enough and greatly reduce the usability of XML comparison. Disclosed embodiments provide an XML comparison process that accepts the customization and reports the correct results, as described in detail below.

FIG. 1 depicts a block diagram of a data processing system in which an embodiment of the disclosed XML comparison process can be implemented, either as a standalone data processing system or as a data processing system functions as a server or client system. The data processing system depicted in FIG. 1 includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments implement an XML comparison API and process with the support of a configuration file, also referred to herein as a filter file. The disclosed processes support general XML file comparison based on text data. If the filter file is provided, the API will compare the XML data based on filter definitions, also referred to as comparison rules.

The filter enables the system to customize the comparison according to various characteristics or comparison rules, including inclusive or exclusive comparison, value comparison based on data type and pattern comparison, key attribute comparison, node relations definition, and namespace support, among others. The comparison rules can be included in the filter file, if used, or directly passed to or loaded by the system.

For inclusive or exclusive comparison, the system defines the inclusive comparison mode or exclusive comparison mode. For example, for inclusive comparison mode, the system can use a definition such as <Filter version="1.0" mode="include">

For exclusive comparison mode, the system can use a definition such as

<Filter version="1.0" mode="exclude">

Inclusive (loose) filter means all nodes and attributes defined in filter file or comparison rules must be compared. Exclusive filter means remove the comparison of nodes and attributes defined in comparison definitions. When the filter is exclusive, the nodes and attributes which are not defined in this filter file will be compared.

The system can perform a value comparison based on data type and pattern comparison. Different comparison methods can be defined for some attributes in the filter file. For example, regular expression "pattern" method can be used for string type attribute. For example, the system can use a definition such as <attribute name="name" comparison_method="pattern_match" pattern="^[A-Za-z]+$"/>

There are other pre-defined methods to support the comparison for the data types such as integer, and double. The tolerance is considered when comparing numeric data. It also takes user-defined precision when converting the numeric data from the string format. For example, the system can use a definition such as <attribute name="points" comparison_method="double" tolerance="0.02"/>

The system can perform a key attribute comparison. In some XML comparison cases, only some key attributes are of concern to the user. If those key attribute values are matched, then the comparison result should be positive, no matter there are other attribute values different or not.

In the filter file, matching keys can be defined for XML node as part of the comparison rules, and multi-level keys are also supported, such as primary key, secondary key and etc. For example the system can user a key definition such as

```
<chk:Checker primary_matching_key="class">
    <attribute name="class" />
    <attribute name="status" />
</chk:Checker>
```

The system can use a node relations definition. Parent-child relations between the XML nodes are supported in the filter file by adding attribute "include_children" in filter file. The relationship will guide how the comparison be performed according to population rules.

For example, if a parent node is not to be compared, its child node(s) might not be compared if the population rule says so. If a parent node is to be compared, its child node(s) might or might not be compared according to the comparison definitions.

The table shown below can be used to define whether the children nodes are involved in comparison or not based on filter mode and node relations definition. Note that an attribute "include_children" just impacts on element child nodes. It has no influence on other children nodes, such as comment, processing instruction and CDATA node.

| | Filter Mode | |
|---|---|---|
| include_children | Include Mode | Exclude Mode |
| TRUE | Compare defined attributes and texts of this node and all children of element type belonged to it. Then all attribute and text nodes of element children wil be compared. It does matter whether they have been defined in filter file or not. | Only compare not defined attributes and texts of this node. Regardless of defined ones in filter and all its children of element type (including their attributes and texts). It does matter whether element children have been defined in filter file or not. |
| FALSE | Only compare what defined in filter file. | Only do not compare what defined in filter file |
| No defined (default) | FALSE | FALSE |

To illustrate, example segments of files to be compared are listed below:

```
<chk:Checker   mod="1222075919"
               name="root:a_24:%mqc_check_sket_fully_constrained_23:"
               user="x_qiao"
               class="%mqc_check_sket_fully_constrained"
               status="pass"
               machine="NT Intel"
               sessionID="x_yzzy84439e4"
               uniqueName="SketchFullyConstrained13816"
               description="Sketch Fully Constrained?">
    <chk:Parameters checkSum="13816">
        <chk:Parameter title="Disabled?"
               value="TRUE"/>
    <chk:Parameter title="Save Log in Part"
               value="TRUE"/>
    <chk:Parameter title="Log Additional Message"
               value=""""/>
    </chk:Parameters>
</chk:Checker>
```

In a first case example, consider that "mode" is "include" and include_children in checker node is "TRUE". An example segment of a filter file is listed below:

```
<Filter mode    = "include" >
<chk:Checker    include_children      = "TRUE"
                primary_matching_key  = "uniqueName">
        <attribute name                ="status"    />
        <attribute name                =" version"  />
</chk:Checker>
```

If <chk:Checker> node is to be compared, and include_children is "TRUE", its defined attributes: "status" and "version" will be compared. Also all element child nodes of <chk:checker> will be compared, including their attribute and text nodes (but not including data nodes, e.g., a comment). It does not matter whether element child nodes of <chk:Checker> are defined in filter file or not.

In a second case example, "mode" is "exclude" and include_children in checker node is "TRUE". An example segment of a filter file is listed below:

```
<Filter mode    = "exclude" >
<chk:Checker    include_children      = "TRUE"
                primary_matching_key  = "uniqueName">
        <attribute name                ="status"    />
        <attribute name                =" version"  />
</chk:Checker>
```

In this case, "status" and "version" in <chk:Checker> node will not be compared, nor all child element nodes of <chk:checker>, including their attribute and text nodes (not including data nodes, e.g., a comment). It does not matter whether child nodes of <chk:Checker> are defined in filter file or not.

As described herein, the filter file is used during the comparison to determine what kind of xml nodes to be compared, which method to be used for comparison. A comparison definitions file shall define the matching keys. In some cases, multi-level matching keys, such as primary key, secondary key and etc, are needed to identify which attributes are to be compared.

The system also can implement namespace support. The namespace is considered in the XML comparison logic. For example, consider a first XML file that has namespace defined in the root node as xmlns:chk=http://www.plmxml.org/Schemas/
PLMXMLSchemaCheckMate\ and node as

<chk:checker . . . > and a second XML file that has namespace defined in root node as xmlns:mqc=http://www.plmxml.org/Schemas/
PLMXMLSchemaCheckMate and node as <mqc:checker . . . >

In the XML comparison in accordance with various embodiments, <chk:checker> and <mqc:checker> will be treated as the same node.

In various embodiments, the comparison results are reported and stored in the data processing system, for example as an HTML file or XML file, and optionally displayed to a user for example via web interface.

In some embodiments, the system includes an API package to support XML comparison. One example of such an API is as follows.

```
int VALIDATE_compare_xml_files (
    const char      *work_file,             /* <I> */
    const char      *master_file,           /* <I> */
    const VALIDATE_xml_comparison_options_s &options, /* <I> */
    int             *compare_result         /* <I/O> */
)
typedef struct VALIDATE_xml_comparison_options_s
{
    char            *filter_file;
    char            *report_file;
    char            *compare_log;
    logical         has_namespace;
    logical         ignore_removed_nodes;
}VALIDATE_xml_comparison_options_t,
*VALIDATE_xml_comparison_options_p_t;
```

In various embodiments, the inputs to the process include two files, in this example, an XML file to be referred to in the exemplary code segments as the work_file, and an XML file to be referred to in the exemplary code segments as the master_file. An optional filter file is used for the comparison, and is referred to in the exemplary code segments as the filter_file.

In the filter file, the comparison rules/definitions are used to determine which nodes and/or attributes to compare with some pre-defined methods, as described herein.

If the input is NULL, the two XML documents will be compared using string comparison method as default.

In some embodiments, the system can use an optional log file, referred to herein as compare_log. The comparison log file is used if the user wants to know the status of each step in the comparison operations from a log file, the argument should be used, otherwise it can be NULL.

Some embodiments use a control variable called, in this example, has_namespace. If this variable is TRUE, the system will compare with namespace; if it is FALSE, the system will compare without namespace.

If the filter file is inputted, the control variable will be not effective. In this case, some definitions in filter file will determine to compare with namespace or not.

Some embodiments use a control variable called, in this example, ignore_removed_nodes. If this variable is TRUE, the system will, when the report is generated, not report and nodes that exist in master file but not in work file. When this variable is FALSE, the system will report all nodes, same with the inputted XML files.

The output, stored and/or displayed, and optionally returned to a calling process, can include a number of variables and other data. A result variable, called in this example compare_result, receives the status of comparison result. The value is 0 when the two XML documents are identical, and 1 when the two XML documents are different.

A return variable output can return an error code, if any.

Various embodiments include different ways in which the input files can be compared. For example, to compare XML documents, one exemplary call is VALIDATE_compare_xml_files to compare XML documents. Both the basic nodes and additional nodes of the XML files are compared.

The system can compare basic nodes. The data nodes in a Check-Mate log for example could be Element, Attribute, and Text. In this case, these three basic nodes are compared.

The system can compare additional nodes. A generic XML file can include such nodes as CDATA, Processing Instruction, Comment nodes besides Element, Attribute, Text, and other, and in this case, these additional nodes are also compared.

The system can ignore unmatched nodes. In some embodiments, when the work file is a subset of master file, the result will be matching. For example, assume a Profile node in work log has only one checker, while in master log, the same profile has 100 checkers. If the checker in work log can find a same checker in master log, the comparison result of the two Profiles will be matching. And the unmatched nodes (the other 99 checkers in master log) will not be displayed in report.

Filter Configurations: In various embodiments, the filter file is defined in standard XML format.

For example, which nodes and/or attributes need to be compared and which comparison method will be taken to compare a special attribute. The types of comparison methods can be pattern, int and double.

Various embodiments include attributes for Filter Root Node. These include "version" to show the version of filter file. These also include "xmlns:chk" to define the namespace for the following nodes. If "xmlns" is defined in filter file, the two XML files will be compared with namespace. These also include "mode", where the comparison definitions contain the filter mode such as inclusive or exclusive. As described above, inclusive (loose) filter means all nodes and attributes defined in filter file must be compared. Exclusive filter means remove the comparison of nodes and attributes defined in comparison definitions.

Various embodiments include attributes for Filter Node. There include primary_matching_key, the value of which is an attribute name of the current node. In the process of comparison, these nodes which have same unique id will be queried and compared. For example, we only need to compare the two "Checker" which have a same "class", otherwise it isn't necessary. If it isn't defined, the two XML documents will be compared in order.

Attributes for Filter Node can also include "namespace", which defines the namespace for the node.

Various embodiments also include attributes for Filter Attribute Node. These include "comparison_method" that defines the comparison method for the attribute. Default is "pattern". For example, "pattern" means the attribute will be compared as string; "int" means the attribute will be compared as int; and "double" means the attribute will be compared as double.

The attribute "pattern" defines a regular expression for string comparison method. When comparison_method is "pattern", it only can be effective in some embodiments. If it isn't defined or its value is empty, default string matching will be taken.

The attribute "tolerance" defines tolerance for int/double comparison method. If it isn't defined or its value is empty, 0 will be taken as default.

Examples of some attributes are below:

```
<Profile>
    <attribute name = "name"    comparison_method="pattern"    pattern ="^[A-Za-z]+$"/>
    <attribute name ="mod"      comparison_method="int"        tolerance="2"/>
    <attribute name = "real"    comparison_method="double"     tolerance="0.001"/>
</Profile>
```

FIG. 2 illustrates an example of an output report according to various embodiments.

FIG. 3 depicts a flowchart of a process in accordance with disclosed embodiments.

The system receives a first file and a second file to be compared (step 305). These files can correspond to the master file and work file as described above, and can be, for example HTML or XML files. Receiving by the data processing system can include loading one or more of the files from a storage, receiving one or more of the files over a network connection, or receiving one or more of the files as passed by an application running on the same or a different data processing system, among other ways known to those of skill in the art.

The system receives comparison rules, as described above (step 310). This step can include receiving a filter file that includes the comparison rules.

The system compares the first file and the second file based on the comparison rules (step 315).

The system produces an output report corresponding to the comparison (step 320). Producing the output report can include printing the report, storing the report, displaying the report to a user, returning the report to a calling process or application, and/or transmitting the report to another data processing system, among others.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, comprising:
receiving, in a data processing system including at least a processor and a memory, an XML master file and an XML work file for comparing corresponding XML data;
receiving comparison rules included in a filter file to customize the comparison in the data processing system, wherein the comparison rules include:
an inclusive definition or an exclusive definition,
a node relation definition,
key attributes comparison,
namespace support, and
value comparison rules based on a data type and a pattern comparison, including a defined tolerance for comparing numeric data;
comparing the XML master file and the XML work file, by the data processing system, according to the comparison rules,
wherein when the filter file has an inclusive definition, all nodes and attributes defined in the filter file are compared, and when the filter file has an exclusive definition, only nodes and attributes which are not defined in the filter file are compared; and
producing an output report corresponding to the comparison.

2. The method of claim 1, wherein the comparison rules include a definition of nodes and attributes of the XML master file and the XML work file that must be compared according to the inclusive definition.

3. The method of claim 1, wherein the comparison rules include a definition of nodes and attributes of the XML master file and the XML work file that must not be compared according to the exclusive definition.

4. The method of claim 1, wherein the comparison ignores nodes of the XML master file that do not match nodes of the XML work file.

5. The method of claim 1, wherein the comparison rules include comparisons for data types including integer and double.

6. The method of claim 1, wherein the key attribute comparison identifies key attributes, wherein when corresponding key attribute values are matched, then the output report is positive regardless of other comparisons.

7. The method of claim 1, wherein the node relations definition includes a definition of parent-child XML node relationships.

8. A data processing system comprising a processor and accessible memory, the data processing system particularly configured to perform the steps of:
receiving an XML master file and an XML work file for comparing corresponding XML data;
receiving comparison rules included in a filter file to customize the comparison, wherein the comparison rules include:
an inclusive definition or an exclusive definition,
a node relation definition,
key attributes comparison,
namespace support, and
value comparison rules based on a data type and a pattern comparison, including a defined tolerance for comparing numeric data;
comparing the XML master file and the XML work file according to the comparison rules,
wherein when the filter file has an inclusive definition, all nodes and attributes defined in the filter file are compared, and when the filter file has an exclusive definition, only nodes and attributes which are not defined in the filter file are compared; and producing an output report corresponding to the comparison.

9. The data processing system of claim 8, wherein the comparison rules include a definition of nodes and attributes of the XML master file and the XML work file that must be compared according to the inclusive definition.

10. The data processing system of claim 8, wherein the comparison rules include a definition of nodes and attributes of the XML master file and the XML work file that must not be compared according to the exclusive definition.

11. The data processing system of claim 8, wherein the comparison rules include comparisons for data types including integer and double.

12. The data processing system of claim 8, wherein the key attribute comparison identifies key attributes, wherein when corresponding key attribute values are matched, then the output report is positive regardless of other comparisons.

13. The data processing system of claim 8, wherein the node relations definition includes a definition of parent-child XML node relationships.

14. A-non-transitory machine-readable medium encoded with computer-executable instructions that, when executed, cause a data processing system to perform the steps of:

receiving an XML master file and an XML work file for comparing corresponding XML data;

receiving comparison rules included in a filter file to customize the comparison, wherein the comparison rules include:

an inclusive definition or an exclusive definition, a node relation definition, key attributes comparison, namespace support, and value comparison rules based on a data type and a pattern comparison, including a defined tolerance for comparing numeric data;

comparing the XML master file and the XML work file according to the comparison rules, wherein when the filter file has an inclusive definition, all nodes and attributes defined in the filter file are compared, and when the filter file has an exclusive definition, only nodes and attributes which are not defined in the filter file are compared; and producing an output report corresponding to the comparison.

15. The machine readable medium of claim 14, wherein the comparison rules include a definition of nodes and attributes of the XML master file and the XML work file that must be compared according to the inclusive definition.

16. The machine readable medium of claim 14, wherein the comparison rules include a definition of nodes and attributes of the XML master file and the XML work file that must not be compared according to the exclusive definition.

17. The machine readable medium of claim 14, wherein the comparison rules include comparisons for data types including integer and double.

18. The machine readable medium of claim 14, wherein the key attribute comparison identifies key attributes, wherein when corresponding key attribute values are matched, then the output report is positive regardless of other comparisons.

19. The machine readable medium of claim 14, wherein the node relations definition includes a definition of parent-child XML node relationships.

\* \* \* \* \*